April 27, 1926.
A. J. N. DUCLOS
1,582,026
METHOD OF AND APPARATUS FOR PRODUCING PLASTIC ARTICLES
Filed May 2, 1923
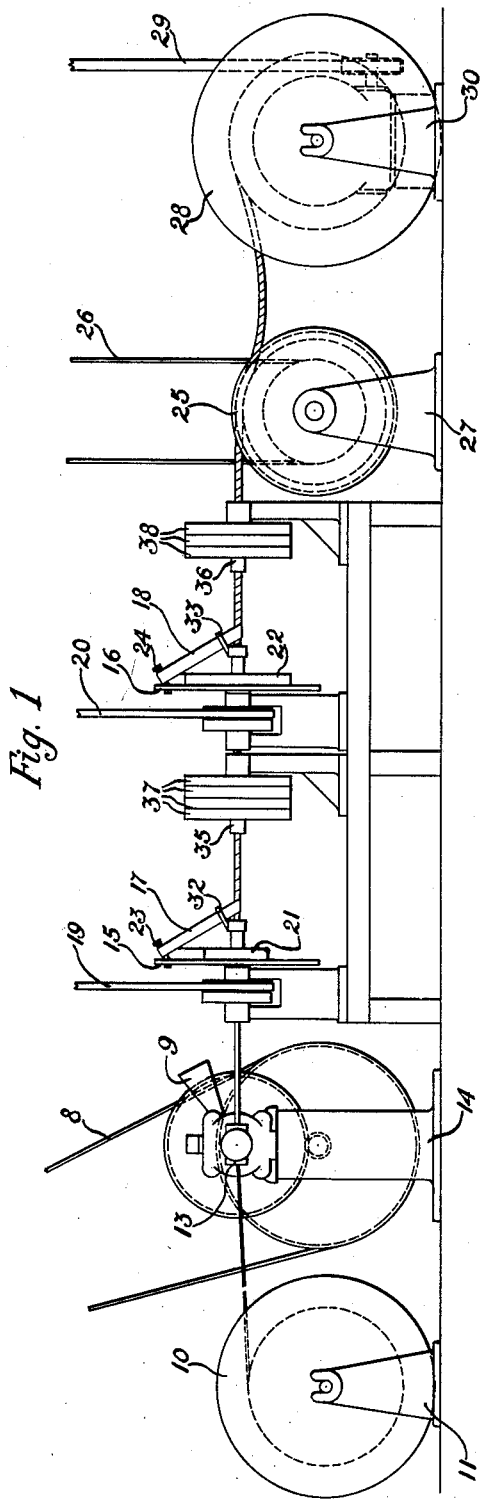
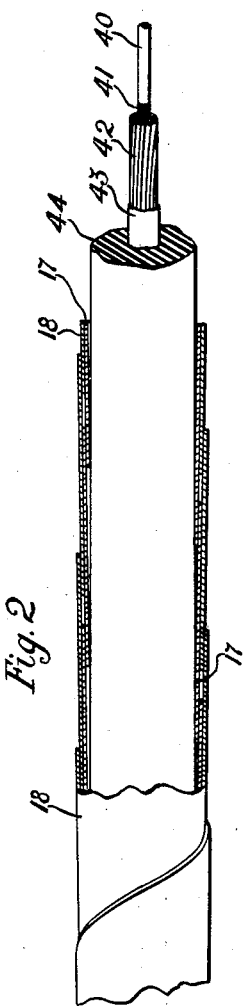
Inventor
Aeneas J.N.Duclos
by H.A.Pattison,
Atty.

Patented Apr. 27, 1926.

1,582,026

UNITED STATES PATENT OFFICE.

AENEAS JOSEPH NORBERT DUCLOS, OF RIVER FOREST, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR PRODUCING PLASTIC ARTICLES.

Application filed May 2, 1923. Serial No. 636,070.

*To all whom it may concern:*

Be it known that I, AENEAS JOSEPH NORBERT DUCLOS, a citizen of the United States, residing at River Forest, in the county of Cook and State of Illinois, have invented certain new and useful Improvements in Methods of and Apparatus for Producing Plastic Articles, of which the following is a full, clear, concise, and exact description.

This invention relates to methods of and apparatus for producing plastic articles and more particularly to the manufacture of a strand of plastic material.

In the manufacture of strands of vulcanizable material it is often desirable to employ material of such plastic nature that it is necessary to surround it with means for retaining the shape thereof until after a vulcanization process has made it self sustaining, as well as for preventing undesirable adhesions of adjacent portions of the material. This is particularly true in the case of sheathed cores, such as electrical conductors insulated with rubber compounds wherein deformations of the plastic sheathing may cause a decentralization of the conductor within and thus reduce the effectiveness of the insulation.

In strands of this sort and especially when they take the form of plastic core sheathings manufactured by the so-called extrusion process wherein the plastic material, maintained at the desired consistency, is forced through a forming die either in a solid mass or around a continuously moving central core, a ribbon or tape of suitable fabric served therearound has been found to produce satisfactory results. Because the forming die is usually heated to such a temperature as to insure the proper placticity of the material when it moves continuously therethrough at a predetermined speed it is essential that there be no unnecessary interruptions in the extruding process.

It is an object of the invention to continuously apply a strand serving to a continuously moving core.

Another object is to insure the application to a continuously moving core of one of a plurality of strands from a plurality of sources containing different amounts of serving material.

A further object is to serve a core with strands from a plurality of sources adapted to become alternately exhausted.

An additional object is to prolong the permissible period of time for substituting a filled carrier for an exhausted carrier of strand material in an apparatus for serving a continuously moving core with a strand.

Another object of the invention is to provide an improved method and apparatus for making a vulcanized rubber strand, and more specifically an electrical conductor with a coating of vulcanized rubber.

In order to attain these objects in accordance with one embodiment of the invention, a plurality of overlapping fabric tapes or ribbons are applied to a continuously moving core of plastic material from a plurality of serving heads arranged in tandem and containing pads of the tape of different lengths. Upon the exhaustion of one of the pads a filled pad is substituted therefor immediately. Since the tape or tapes being served from the remaining pad or pads is sufficient under usual conditions to maintain the shape of the core for an appreciable length, no interruption of the manufacturing process is required and ample time is allowed which may be safely occupied in substituting the pads and restarting the idle serving mechanism unit.

These and other objects not specifically mentioned will appear from the following description and the accompanying drawings illustrating one embodiment of the invention, Fig. 1 of which shows an elevation of the serving mechanisms and the associated extruding and take-up mechanisms, Fig. 2 shows an enlarged longitudinal elevation partially in section of the served core, and Fig. 3 shows a cross section of such core.

Referring to the drawings, in which like numerals designate similar parts throughout the various views, a supply reel 10 supported by a shaft rotatably mounted on floor brackets 11 carries a supply of core which may be drawn through a die 13 of an extrusion machine 14. After leaving the extrusion machine wherein it is coated with a sheathing of suitable plastic vulcanizable material, such as a rubber compound, the core passes through central openings of two serving heads 15 and 16 arranged in tandem and which serve thereon tapes 17 and 18 respectively of cotton or other suitable fabric. The sheathed and taped core then passes around the capstan 25 driven by a belt 26 and mounted in floor brackets 27 and is then wound upon a take-up reel 28 driven by a belt 29 and rotatably supported by floor brackets 30. The extrusion machine 14 may be of any well known type such as is commonly employed in covering electrical conductors with vulcanizable rubber and consists essentially of a hopper 9 through which the material may be fed into a suitable mixer driven by gearing from a belt 8 and is thence supplied in a suitable plasticity into the die 13 through which the core is drawn. In some instances it is desirable to independently apply two coatings of the same character or of dissimilar characters and it is understood that this may be accomplished by passing the core through a plurality of extrusion machines arranged in tandem. For instance, in the case of the sheathed core or electrical conductor shown in Figs. 2 and 3 the core carried by the supply reel 10 may be formed of a solid centrally located metallic conductor 40 covered with a suitable protective coating of liquid bitumen 41 and surrounded by a plurality of spirally arranged smaller solid metallic conductors 42. This core is first passed through an extrusion machine (not shown) similar to 14 wherein it receives a thin coating 43 of material of one character, and then through the machine 14 where it receives a very thick coating 44 of very plastic material of another character.

The serving heads 15 and 16 may be of any suitable type rotated at a definite speed by belts 19 and 20 respectively, operating on suitable drive wheels, and adapted to carry pads 21 and 22 respectively of suitable fabric, the tapes being fed therefrom over the associated guide pins 23 and 24 respectively and through the guide fingers 32 and 33 respectively. Suitable tubular holders 35 and 36 respectively carry additional pads 37 and 38 respectively of the fabric tapes. The tape 17 is applied in spiral formation directly upon the outer surface of the coating 44, a coating of soapstone being applied thereto manually if desired, and the tape 18 is wrapped thereover.

It will be noted that the pads 21 and 22 carried by the serving mechanisms 15 and 16 respectively differ materially in size, thus containing different lengths of tape. When the smaller pad is exhausted another full pad is moved from the holder along the core over the associated depressed guide finger and mounted on the serving head. The end of the tape of the new pad is then fed over the associated guide pin and finger and suitably secured to the sheathed or sheathed and taped core and the serving head started into operation. In this manner a considerable length of time is provided in which the exhausted pad may be replaced during which period one fabric tape is being applied to the sheathed core. Although it may be desirable to employ the two overlapping tapes throughout the length of the core, the single tape proves ample for the short length of core which passes the serving head during the change in pads. The strand, taped as above described, is then introduced into any suitable type of vulcanizer for vulcanizing the plastic material. Preferably the vulcanizer is of a type to accommodate the storage reel 28 containing the taped strand.

It is evident that with this invention there is no necessity of stopping the extrusion process to change pads, sufficient time is provided in which the pads may be changed and a serving of at least one confining tape is insured at all times.

What is claimed is:

1. The method of serving a core, which consists in simultaneously serving a core with strand from a plurality of sources containing different amounts of serving material.

2. The method of making a plastic article in strand form, which consists in extruding plastic material in strand form and simultaneously serving the strand with fibrous material supplied from sources adapted to become exhausted at different times.

3. The method of coating an electrical conductor with vulcanized rubber, which consists in extruding vulcanizable rubber around the conductor, simultaneously serving the coated conductor with a plurality of fabric tapes from a plurality of sources containing different lengths of tape, storing the taped conductor and then subjecting the said conductor to heat and pressure sufficient to vulcanize the rubber coating.

4. In an apparatus for serving cores, means for continuously moving a core, and two serving devices for serving the core with strands from continuous supplies thereof differing materially in length.

5. In an apparatus for making plastic articles in strand form, means for extruding plastic material in strand form, and two serving devices for serving the strand with fibrous material, said serving devices carrying different amounts of fibrous material.

6. In an apparatus for making plastic articles in strand form, means for continuously extruding plastic material in strand form, and two serving devices to serve fabric strands upon the plastic strand simultaneously while strand material is available to both and one of said devices continuing to serve upon the exhaustion of the supply of material for the other, said serving devices carrying different lengths of strand material.

In witness whereof, I hereunto subscribe my name this 23d day of April A. D., 1923.

AENEAS JOSEPH NORBERT DUCLOS.